J. D. JONES.
Blind-Stop.

No. 159,417.

Patented Feb. 2, 1875.

WITNESSES:
W. W. Hollingsworth
Solon C. Kernon

INVENTOR:
Jno. D. Jones
BY

ATTORNEYS.

UNITED STATES PATENT OFFICE.

JOHN D. JONES, OF OMAHA, NEBRASKA.

IMPROVEMENT IN BLIND-STOPS.

Specification forming part of Letters Patent No. 159,417, dated February 2, 1875; application filed January 4, 1875.

*To all whom it may concern:*

Be it known that I, JOHN D. JONES, of Omaha, in the county of Douglas and State of Nebraska, have invented a new and Improved Blind-Slat Adjuster; and I do hereby declare that the following is a full, clear, and exact description of the same, reference being had to the accompanying drawing, forming a part of this specification, in which—

Figure 1:
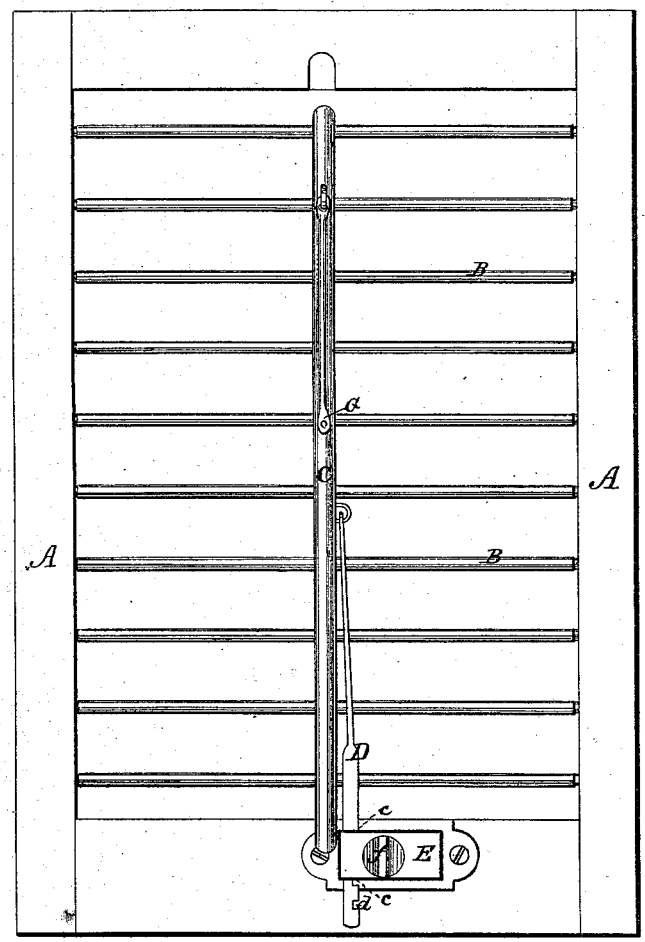
Figure 2:
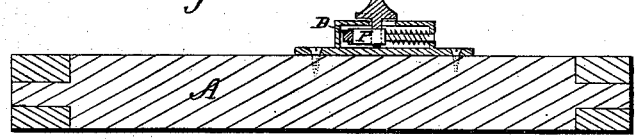

Figure 1 is a front elevation, and Fig. 2 a horizontal cross-section.

The invention relates to a blind-slat adjuster of that class of outside blinds or shutters that are provided with movable slats connected by a common bar.

The invention consists in combining, with the notched bar and locking-bolt of a blind-slat adjuster, a box that allows the notched part of bar to pass through slots thereof, while the bolt and spring are effectually protected and yet easily retracted by a thumb-piece.

A represents one panel, whose slats B are connected, by eyes or otherwise, with bar C. To the latter I pivot a rod, D, having the notches $d$ near the lower end. This rod is made to pass across and through opposite slots $c\ c$ of a box, E, being thus guided in its reciprocating movements, while a spring-catch, F, having thumb-piece $f$, and working in and out of the notches $d$, locks it at various points of elevation.

The slats can thus be opened more or less, as the weather or circumstances may dictate.

The wire G on top of the bar serves to connect the panel with the one above, and thus the expense of a catch to each.

The advantages of this device are, that it prevents the slats from rattling when a wind is blowing; enables the slats always to be kept with the pitch upward, and thus always clean; the lock being on the inside of panel, the slats cannot be opened from the outside, and, when locked tight, are as much protection as any shutter.

I am aware that blind-slats have been heretofore held more or less open by a notched bar and spring; but

What I claim is—

The box E, having slots $c\ c$, and provided with a spring-catch, F, having thumb-piece $f$, in combination with a rod, D, pivoted to a slat-bar, C, and having notches $d$, as and for the purpose specified.

JOHN D. JONES.

Witnesses:
BYRON REED,
P. H. REED.